No. 834,034. PATENTED OCT. 23, 1906.
A. VOSSKÖHLER.
MACHINE FOR MAKING SUGAR GOODS.
APPLICATION FILED JAN. 2, 1906.
2 SHEETS—SHEET 1.
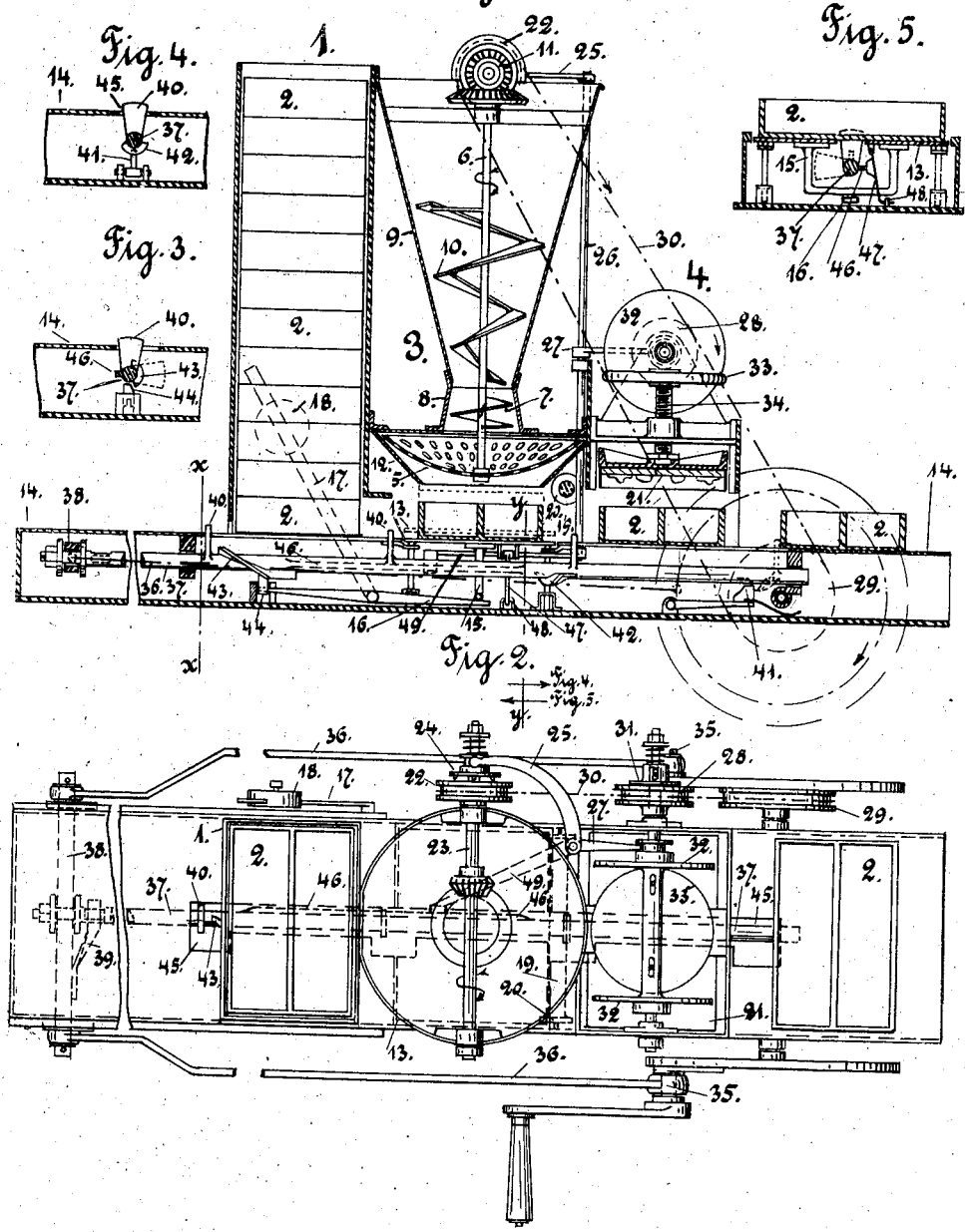
Witnesses:
Mary Peters
Alfred Bühring
Inventor:
Albert Vossköhler
by Erich Peters
his atty.

No. 834,034. PATENTED OCT. 23, 1906.
A. VOSSKÖHLER.
MACHINE FOR MAKING SUGAR GOODS.
APPLICATION FILED JAN. 2, 1906.
2 SHEETS—SHEET 2.
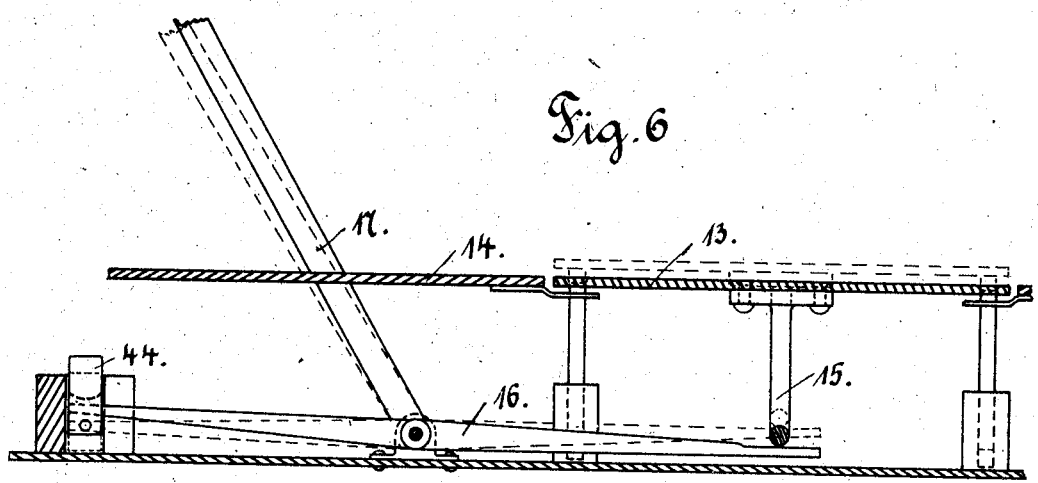
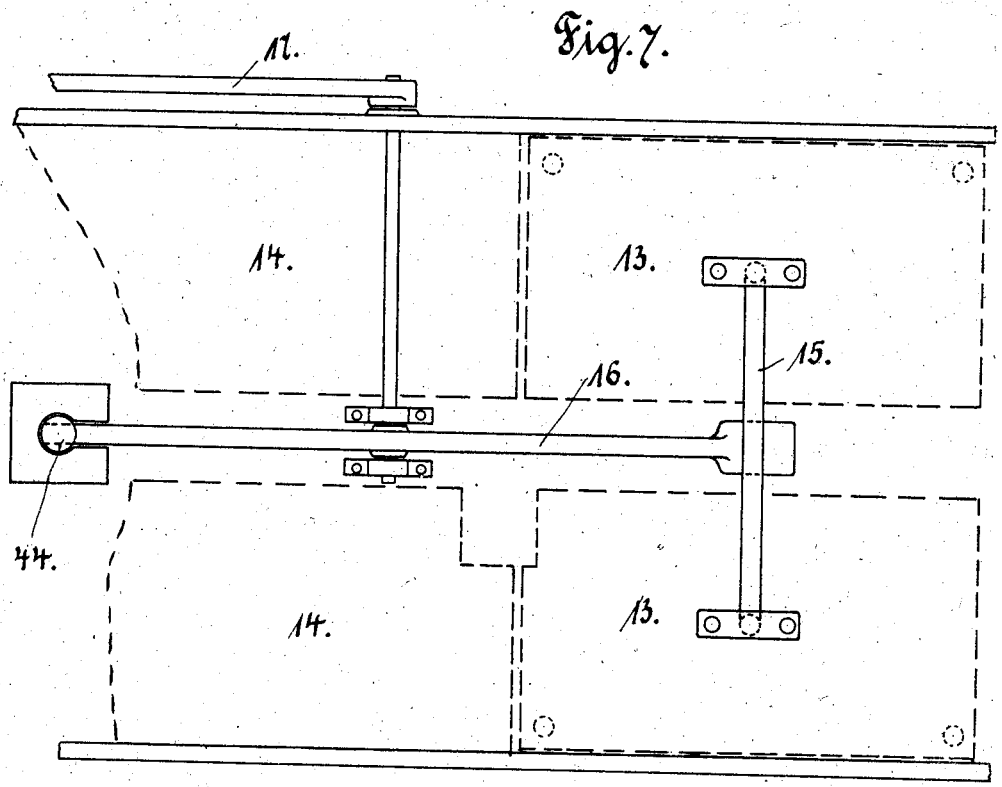
Witnesses:
Marg. Peters.
Alfred Gühring
Inventor:
Albert Vossköhler
by Erich Peters his atty

UNITED STATES PATENT OFFICE.

ALBERT VOSSKÖHLER, OF EGELN, GERMANY.

MACHINE FOR MAKING SUGAR GOODS.

No. 834,034.　　　　　Specification of Letters Patent.　　　　Patented Oct. 23, 1906.

Application filed January 2, 1906. Serial No. 294,339.

*To all whom it may concern:*

Be it known that I, ALBERT VOSSKÖHLER, confectioner, a subject of the King of Prussia, German Emperor, residing at 4 Breiteweg, Egeln, Germany, have invented a new and useful Improvement in Machines for Making Sugar Goods, of which the following is a specification.

The object of my present invention is a machine by means of which the starch-molds for making the well-known sugar-ice goods can be produced not only much more rapidly, but also in a much more regular and perfect form than now, so that the present irregularity of the material, which has up to the present injured the appearance, the uneven formation in the casting-marks, and the like, are avoided.

The machine works automatically, so that the finished forms are pushed out of it, and neither the filling of the molds with the material nor the forms themselves can be influenced by hand.

In the accompanying drawings the machine is shown in a form of construction, taken, by way of example, as follows:

Figure 1 is a vertical longitudinal section. Fig. 2 is the view from above. Fig. 3 is a transverse section on line $x\ x$. Fig. 4 is the same on line $y\ y$. Fig. 5 is the same on line $y\ y$ seen from the right. Fig. 6 is a side view of the weight device in a larger scale. Fig. 7 is a view from above to the same, the cover-plates being shown by dotted lines.

The machine consists principally of a receptacle 1 for the molds 2, a device 3 for filling the molds, a press 4 for the forms, and a device with a weight to start automatically the working of all the various parts of the machine—that is, to put them out of action.

The molds 2, lying in the mold-receptacle 1, are removed from the same singly by a special device for the purpose, which works from time to time and which in a form of construction taken by way of example is described below, and are pushed under a sieve 5, which turns on a spindle 6. Above the sieve 5 is a neck 8 of a funnel 9, provided with a spiral transporter 7, resting on the spindle 6 and intended to receive the material for the forms, which consists usually of starch-flour, with other ingredients added. In the funnel 9 moves a spiral transporter 10, also connected to the spindle 6, which conducts the material below and prevents its sticking fast in the funnel. This device, which works by means of a cog-wheel 11, pushes the material for the forms through the sieve, which is closed above, from where it falls into the mold 2 over the chute 12. This mold rests on the platform 13, which forms a part of the slideway 14, along which the molds 2 are shoved. The platform 13 is connected to a device with a weight—viz., bow 15, double lever 16, and lever 17—the sliding weight 18 of which can be adjusted to correspond to the height, respectively the weight, of the material which is to be placed in the mold. Therefore platform 13, which is generally above the surface of the slideway 14 when an empty mold rests upon it, Fig. 6, dotted lines, sinks to the surface of the slideway as soon as the mold has been filled. Now the grippers are automatically set in motion and shove the mold under the form-press 4. On the way there the chutes 12 remove the superfluous part of the material, which lies piled up, and a comparatively heavy roller 19, respectively one under pressure of a spring, with its side flanges 20 rolling on the edges of the mold, slides over the portion of the material lying higher, pressing the same slightly and smoothing it, so that the molds are always filled to the same height and arrive under the form-plate 21 containing material of the same density. This press resembles in general the construction of the well-known beam-machine for metal stamps, &c., which works reciprocally through friction-wheels, and shows, therefore, nothing new in construction, except in its application to this special purpose and in connection with the other devices for securing the general effect of the machine.

On the cog-wheel driver for the spindle 6 of the funnel is a coupler 24, connecting the driving-wheel 22 with the cog-wheel spindle 23, which is set in action by a lever 25. This lever 25 sits on a vertical axis 26, on which the lever of the fricton-press 4 also sits. The setting in motion and the putting out of action of the spiral transporter in the funnel occurs, therefore, at the same time as the reversal of the press and, in fact, in such a manner that when the spiral transport in the funnel stops moving the stamp of the press is raised and begins to sink when the spiral transport again begins to move.

The motive power is derived from the driving-wheels 22, 28, and 29 and the driving-cord 30 in continual motion; the driving-wheel 28 moves only by means of surface friction on a movable disk 31 the friction-rolls 32 of the press-wheel 33, so that a rubbing of the wheel 28 begins at the highest or lowest position of the press-spindle.

Attached to the principal driving-wheel 29 are crank-pins 35, which by means of sliding bars 36 move a round bar 37 backward and forward in a horizontal direction underneath the slideway 14. This bar 37 is attached to the transverse bar 38 in such a way as to be able to turn on its axis. On a flattened part of this bar 37 a spring 39 presses, so that it will not turn arbitrarily on its axis. This turning on the axis takes place in order that a number of grippers 40 may be turned into the way of the molds 2, so that they catch the molds from behind and push them forward the axial length of the stroke of the bar 37, after which they are again turned out of the way of the molds, Figs. 3 and 4.

The turning of the bar 37 is caused by spiral attachments on the same, which come in contact with immovable obstacles. Near the end of the bar 37 when the same has been pushed to the right lies a pawl 41, over which the spiral piece glides and then is caught behind it. If the bar 37 then moves toward the left, it is at the same time so turned around that the grippers 40 lie horizontal, because the spiral piece is just so short that its end at this position of the grippers 40 slides by the rim 41.

In order to bring the grippers 40 into the upright position, so that they may remove the molds 2, there is attached to the bar 37, near its left end, a second spiral piece 43. When the mold 2, resting on the platform 13, has been filled so full of the material that it has raised the sliding weight 18, a peg 44 is shoved in front of this spiral piece, with which the latter comes in contact when the bar 37 is moved toward the left, causing said bar to be turned a quarter of its circumference and raising the grippers 40 upright, so that they come through the longitudinal slit 45 in the slideway 14 and when the bar 37 moves toward the right push forward all the molds standing on the slideway 14, after which the action of 41 and 42, as described above, is repeated—viz., the grippers 40 are again brought below the surface of the slideway. The mold now resting on the platform 13 being empty, the weight sinks, whereby the peg 44 also is pulled down, and the turning of the bar—that is, the bringing upward of the grippers—is discontinued until the mold is full again, and the weight once more acts; further, is attached to the bar 37 a horizontal shaft 46. When the weight device, consisting of the parts 13 15 16 17 18, causes the spindle to turn, as above described, this shaft appears on the side of the bar 37 and pushes a hook 47, which is attached to the platform 13, into an immovable eye 48, by means of which the platform is held fast during the time that the molds are pushed along the slideway. As soon as the shaft 46 is moved upward on the turning bar 37 the hook 47 slips out of the eye 48, and the platform 13 with the empty mold resting upon it rises.

The rib 46 pushes in addition a lever 49 to one side, which lever is attached to the axis 26 and sets in or discontinues action of the funnel 3 and the press 4, as described above. Therefore during the change of the molds neither the filling with material nor the action of the press takes place.

What I claim as my invention, and desire to secure by Letters Patent, is—

1. The combination, in a machine for making forms to cast sugar-ice goods, of a receptacle, boxes in the same lying one above the other, a filling apparatus having a funnel and a sieve, a press receiving the patterns to be molded, a slideway bearing the said receptacle, filling apparatus and press and having a slot, a catching device to move the boxes on the slideway periodically, and means to set in action the filling apparatus, press and catching device, all as described and set forth.

2. In a machine for making forms to cast sugar-ice goods a filling apparatus consisting of a funnel with a neck, a spindle lying axially in the same, a sieve at its one rear end and a gear at its other end, a spiral transporter in the funnel and such like in the neck of same, connected to the spindle, a chute underneath the funnel-neck and a roller beside that chute, all as described and shown.

3. In a machine for making forms to cast sugar-ice goods a catching device for moving on the boxes, consisting of a slideway having a slot, a turnable bar moving to and fro under that slot, grippers on said bar and spiral pieces connected to it, to be caught periodically by pegs and rims in order to turn the bar, a cross-bar fitted to the rear end of said bar, cranks and a connecting-rod between the cranks and the cross-bar, all as and for the purpose set forth.

4. In a machine for making forms to cast sugar-ice goods means for setting in action the filling apparatus, press, catching device and the propelling of the boxes, consisting in a winch-handle connected to a crank-disk, a driving-wheel on the disk, idle driving-wheels on the axle of the press and the axle of the cog-wheels of the filling apparatus and a communication of movement between them, a coupling working on the driving-wheel on the axle of the cog-wheels, a friction-disk working on the driving-wheel of the press and coupling-levers acting on said devices, an axle bearing said levers, an adjusting-lever at the lower end of this axle, a shaft along the sliding bar below the slot in the slideway, touching the adjusting-lever, all as described and for the purpose set forth.

In witness whereof I have hereunto set my hand in presence of two witnesses.

ALBERT VOSSKÖHLER.

Witnesses:
 MARIE SCHNEIDER.
 ALFRED BÜHRING.